United States Patent Office 3,269,957
Patented August 30, 1966

3,269,957
STABILIZED ANTIMONY-TIN OXIDE CATALYSTS
James Robert Bethell, Epsom Downs, England, assignor to The Distillers Company Limited, Edinburgh, Scotland, a British company
No Drawing. Filed May 15, 1963, Ser. No. 280,721
Claims priority, application Great Britain, May 23, 1962, 19,749/62
3 Claims. (Cl. 252—437)

This invention relates to catalytic compositions and in particular to catalytic compositions for use in oxidation reactions.

According to the present invention a catalyst composition suitable for catalysing the vapour phase oxidation of hydrocarbons comprises a material selected from the group consisting of antimony tetroxide admixed with stannic oxide and a composition constituted by antimony, tin and oxygen and is stabilised by the addition of a compound of bismuth.

The catalytic composition may be regarded either as a mixture of antimony tetroxide with stannic oxide or as a compound of antimony, tin and oxygen, e.g., tin antimonate; under the reaction conditions either or both forms may be present.

The catalytic composition may be prepared from any of the oxides of antimony and tin, or from compounds of tin or antimony which on heating in the presence of an oxygen-containing gas, such as air, are converted to the oxides provided the final composition contains antimony tetroxide and stannic oxide. Oxides of antimony and tin, or substances yielding these oxides, which may be used in the manufacture of the catalytic composition include antimony trioxide, antimony tetroxide, antimony pentoxide or mixtures of such oxides; stannic oxide, stannous oxide, or mixtures of such oxides. Hydrated forms of these oxides may also be used, for instance, such as are formed by the action of aqueous nitric acid on antimony or tin metals or on mixtures of the metals. The catalyst may be prepared for instance by mixing together any of the oxides of antimony and tin, or substances yielding these oxides, and subjecting the mixture to a heat-treatment in the presence of an oxygen containing gas such as air, for instance at a temperature between 550° and 1100° C. Where the initial components are antimony tetroxide and stannic oxide themselves, it is still preferred to subject the mixture to a prior heat-treatment with or without oxygen for instance at a temperature between 550° and 1100° C.

A particularly preferred method of preparing the antimony oxide/tin oxide catalytic composition comprises intimately mixing stannic oxide or the hydrated oxide obtained by the action of aqueous nitric acid on tin metal, with antimony pentoxide, antimony tetroxide, or the hydrated oxide formed by the action of aqueous nitric acid on antimony metal and heat-treating the resulting mixture at 550° to 1100° C. in the presence of an oxygen-containing gas such as air.

Another preferred method of preparing the antimony oxide/tin oxide catalytic composition comprises hydrolysing with water cationic salts of the metals, such as the chlorides, and recovering and heating the resulting precipitate. To obtain complete hydrolysis it may be necessary to add a volatile base such as ammonia. Either or both of the metal oxide components of the composition may be prepared in this way. Particularly useful catalytic compositions can be prepared by this method from stannic chloride and antimony pentachloride by mixing them together in aqueous media and adding ammonia until the pH is greater than 5.0, recovering the precipitate and heating it at a temperature between 550° and 1100° C.

When the tin and antimony compounds in the mixture are present in the lower valency state, i.e. as divalent tin or trivalent antimony compounds, it is particularly preferred to subject the mixture to a preliminary heat-treatment in an atmosphere comprising oxygen and an inert gas such as nitrogen, carbon dioxide or steam, the temperature being controlled so that no part of the catalyst during this preliminary heat-treatment exceeds a temperature of about 650° C.; in this way loss of the lower valent metallic compounds by volatilization is avoided. A convenient way of doing this is to heat pellets of the catalyst in a furnace, the temperature of which is raised from about 300° to about 650° C. over a period of not less than about 8 hours, while passing steam of air over the catalyst. After this preliminary heat-treatment the mixture is then subjected to a final heat-treatment in air at a temperature in the range 550° to 1100° C.

The atomic ratio of tin to antimony in the catalytic composition may vary within moderately wide limits, for instance between 0.1:1 and 20:1, although compositions containing proportions of tin to antimony outside this range may be useful for some purposes.

By whichever method the oxides or hydrated oxides have been prepared, the mechanical stability of the finished catalyst is enhanced by washing, preferably with water before drying.

The catalyst composition may be used for catalysing the vapour phase oxidation of organic hydrocarbons, production of acrylonitrile and methacrylonitrile by vapour phase reaction at elevated temperature of propylene or isobutene with oxygen and ammonia, and the production of acrolein or propylene, hydrogen cyanide from methanol and ammonia, and diolefins from mono-olefins.

In carrying out reactions of this type on the industrial scale for reasons of economy the life of the catalyst is of considerable importance. It is known that under certain operating conditions, the above catalysts may slowly lose part of their activity. The loss of activity may, for example, be due to the deposition of carbon or organic material on the surface of the catalyst.

It has now been found that this loss of activity may be prevented or substantially reduced and the life of the catalyst thereby increased by the addition of the metal compound specified above to the catalytic composition.

The addition of bismuth to the catalytic composition may be made in any suitable manner and at any time but preferably during the preparation of the catalyst, and before the final drying thereof. Bismuth may be added in the form of its oxide or as compounds which undergo thermal decomposition to the oxides during the preliminary heat treatment or at the temperatures employed for the reaction e.g. metal nitrates or formates or as non-decomposable salts such as for example phosphates, molybdates or phosphomolybdates. Preferably the addition is made by slurrying the filter cake, produced after filtering and washing the catalyst mixture, with a solution or slurry of the oxide or compound of the metal and subsequently drying, and if desired, pelleting the resultant mixture.

The proportions of bismuth incorporated in the catalyst composition may vary according to the precise degree of hardness and other properties of the catalyst desired. Generally, incorporation of about 2% on a molar basis of the additive is sufficient.

The manufacture and use of the catalyst of the present invention is further illustrated (but in no way limited) by the following example, in which all parts referred to are parts by weight.

*Example*

14.8 parts of powdered tin was added in small portions over 30 minutes to a boiling solution of 44 parts of nitric acid (S.G. 1.42) in 350 parts of water. 60.9 parts of powdered antimony (60.0 p.b.w.) was added in small portion over 30 minutes to 176 parts of concentrated nitric acid (S.G. 1.42) at 95–100° C. Both mixtures were boiled for 15 minutes, mixed and boiled again for 15 minutes. The suspension was cooled to 40° C. the supernatant liquid removed and the solid resuspended in 500 parts of water and stirred for 15 minutes. The mixture was allowed to settle, the supernatant liquid removed and once again resuspended in 500 parts of water. The mixture was boiled, with stirring for 1 hour, cooled to 40° C. and the liquid removed as before. The resuspension in cold water was then repeated and the solid finally collected on a filter.

2.91 parts of bismuth trioxide was made into a slurry with a little water and added to a slurry of the above solid. The mixture was thoroughly stirred, dried, first on a steam bath and then in an oven at 120° C. The dry solid was sieved to pass 30 mesh B.S.S., 1% w./w. graphite added and made into 3 pellets.

A gaseous mixture of 10% butene-2, 50% v./v. air and 40% v./v. steam was passed over this catalyst at 450° C., and 4 secs. contact time for a period of 1358 hours. During this time a yield of 59% butadiene was maintained.

I claim:

1. A catalytic composition suitable for catalyzing the vapor phase oxidation of hydrocarbons consisting essentially of a material selected from the group consisting of antimony tetroxide admixed with stannic oxide and a composition constituted by antimony, tin and oxygen, said material being stabilized by the addition of an oxide of bismuth, the amount of the oxide being present in an effective amount up to about 2% on a molar basis substantially to reduce loss of catalyst activity and thereby increase the life of the catalyst.

2. The catalytic composition of claim 1 wherein the ratio of tin to antimony is between about 0.1:1 and about 20:1.

3. The catalytic composition of claim 1 wherein the metal oxide is formed by the heat treatment of a compound selected from the group consisting of the nitrate, formate, molybdate, phosphate, and phosphomolybdate of said metal.

References Cited by the Examiner

UNITED STATES PATENTS

| | | | |
|---|---|---|---|
| 2,904,580 | 9/1959 | Idol | 260—465.3 |
| 2,941,007 | 6/1960 | Callahan | 260—604 |
| 3,044,965 | 7/1962 | Callahan | 252—456 |
| 3,094,552 | 6/1963 | Wood et al. | 260—465.9 |
| 3,094,565 | 6/1963 | Bethell et al. | 260—604 |
| 3,135,807 | 6/1964 | Grasseli et al. | 260—614 |
| 3,152,170 | 10/1964 | Barclay et al. | 260—465.3 |

MILTON WEISSMAN, *Primary Examiner.*

MAURICE A. BRINDISI, *Examiner.*

R. M. DAVIDSON, R. J. GREIF, *Assistant Examiners.*